Figure 1:
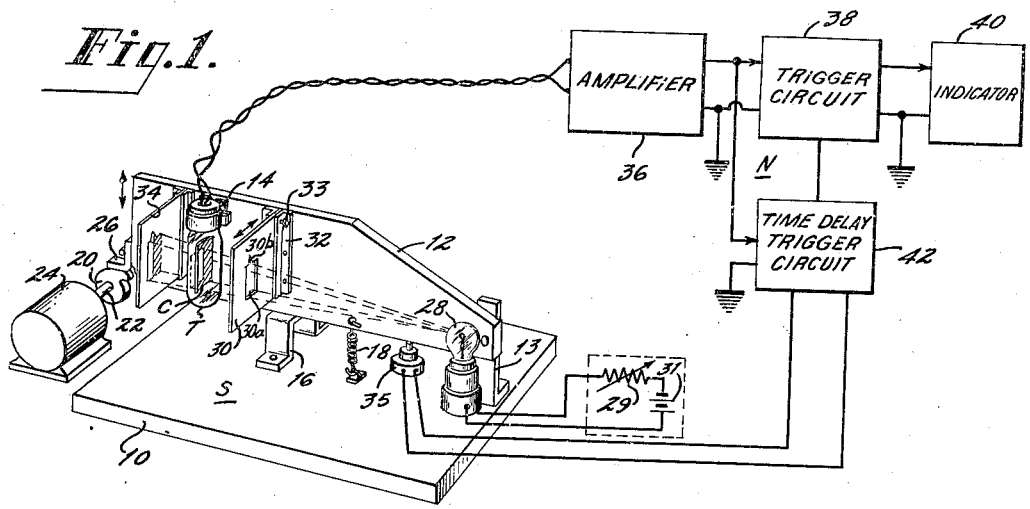

Nov. 8, 1949   R. E. SCHELL   2,487,599
MICROPHONISM TESTING APPARATUS
Filed April 30, 1949

Inventor
ROGER E. SCHELL
By
Morris L. Rabkin
Attorney

Patented Nov. 8, 1949

2,487,599

UNITED STATES PATENT OFFICE 2,487,599

MICROPHONISM TESTING APPARATUS

Roger E. Schell, West Collingswood, N. J., assignor to Radio Corporation of America, a corporation of Delaware Application April 30, 1949, Serial No. 90,717

12 Claims. (Cl. 315—364)

My invention relates to improvements in apparatus for testing electron tubes, and particularly to apparatus for determining the effect of mechanical shock and vibration on the operating characteristics of electron tubes.

In many instances, electron tubes are used in installations where the tubes are subject to mechanical shock and vibration which causes vibratory displacement of the tube elements. It is well known that vibratory displacement of the tube elements will cause the tube current to fluctuate, resulting in the generation of undesired signals which interfere with useful signals. Undesired signals which originate in tube element vibration are often designated "microphonics," and will be so referred to herein.

It is a general object of my invention to provide an improved apparatus for determining the effect of mechanical shock and vibration on the operating characteristics of an electron tube.

It is a further object of my invention to provide an improved apparatus of the foregoing type which will provide an absolute indication of the relative resistance of electron tubes to mechanical shock and vibration.

Another object of my invention is to provide an improved apparatus of the foregoing type which can be used by unskilled operators.

A further object of my invention is to provide an improved apparatus for investigating microphonics in photoelectric tubes.

According to my invention, the foregoing and other objects and advantages are obtained by utilizing a testing network which is responsive only to signals of predetermined amplitude and duration. The tube to be tested is subjected to an accurately reproducible mechanical shock, and the resulting microphonic signal is applied to a testing network which will respond only if the microphonic signal continues at or above a predetermined level for a predetermined time. The testing network includes a first trigger circuit responsive only to signals of predetermined magnitude, and a time-delay trigger circuit for rendering the first trigger circuit insensitive to any signals for a controlled time interval following the shock excitation of the tube being tested. By varying this time interval, either the initial amplitude of the microphonic or the relative decay rate thereof can be determined without requiring any interpretative or evaluative skill on the part of the operator of the apparatus.

Figure 2:
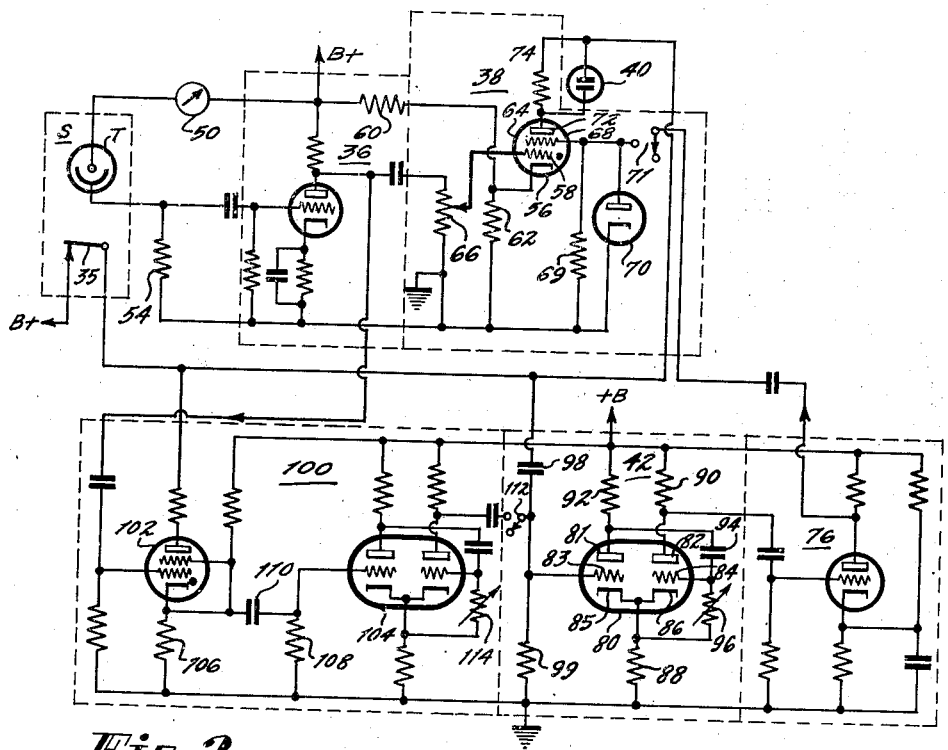

A more complete understanding of the invention may be had by reference to the following description of an illustrative embodiment thereof, when considered in connection with the accompanying drawing, in which:

Fig. 1 illustrates an apparatus for determining microphonic properties of photoelectric tubes in accordance with the invention, and Fig. 2 shows typical circuits suitable for use in the apparatus of Fig. 1.

It will be appreciated that any testing procedure involving comparison techniques requires accurately controlled, reproducible testing conditions. Moreover, the testing system should be arranged to simulate normal operating conditions for the unit being tested. In testing electron tubes for microphonic properties, it is advisable to consider both the particular equipment in which the tubes are to be used and the type of tube involved in order to obtain the best possible results. In general, the apparatus must include means for subjecting the tube being tested to an accurately reproducible mechanical shock or vibration, and, in addition, means for uniformly energizing the tube in a manner simulating normal operation thereof. As far as the shock-producing means is concerned, it is advisable to simulate as nearly as possible the type of shock to which the tube will be subjected in use, while energization of the tube may involve special problems, as in the case of photoelectric tubes, for example. In order to illustrate a complete solution for a particular microphonism testing problem, as well as to illustrate the general principles of my invention, I have shown, in Fig. 1 of the drawing, a complete apparatus for testing photoelectric tubes in accordance with the invention to determine their fitness for use in equipment wherein the tubes will be subject to mechanical shock in a direction parallel to the longitudinal axis thereof. However, it will be understood that the invention is not limited to testing photoelectric tubes, nor to determining the effect of "axially directed" shock.

Referring to Fig. 1, the portion of the apparatus shown in perspective comprises an arrangement for subjecting a tube to be tested to a reproducible mechanical shock, as well as means for uniformly illuminating the photosensitive surface of a photoelectric tube. For convenience of discussion, this portion of the apparatus will be referred to as the shock producing mechanism S. The shock-producing mechanism S includes a rigid base member 10 having a movable arm 12 pivotally supported at one end on a bracket 13 projecting from the base 10. A tube socket 14 is mounted on the free end of the arm 12 to hold a tube T during testing thereof, and the free end of the arm 12 is normally held against a stop 16 on the base 10 by a spring 18. A cam 20, mounted on the shaft 22 of a motor 24, is adapted to engage a cam follower 26 which is adjustably attached to the free end of the arm 12, the arrangement being such that rotation of the cam 20 will recurrently raise and release the arm 12, causing the latter to move through an arcuate path of predetermined length (determined by the adjustment of the cam follower 26), and to strike abruptly against the stop 16, thereby subjecting the tube T being tested to a reproducible mechanical shock directed along the longitudinal axis of the tube. The cam 20 is preferably driven at a speed of from 60–100 revolutions per minute.

As was mentioned, it is also necessary to provide means for energizing the tube being tested in a manner simulating normal operation thereof. In the case of an ordinary vacuum tube, a gas-filled tube, or the like, operating voltages can be supplied to the tube from the voltage supply source for the measuring and indicating apparatus. In the case of photoelectric tubes, it is also necessary to provide means for uniformly illuminating the surface of the photosensitive cathode in the tube. In the apparatus shown in the drawing, a light bulb 28 is mounted on the base 10, preferably in alignment with the pivotal axis for the arm 12, so that the bulb 28 will remain at a substantially fixed distance from the tube T being tested during movements of the arm 12 without subjecting the bulb 28 to any appreciable shock. If the bulb 28 were mounted on the arm 12, where it would be subject to considerable shock and vibration, the output signal from the phototube being tested would contain microphonics due to vibration of the bulb filament in addition to microphonics due to vibration of the tube elements. The bulb 28 can be supplied with current from any suitable source, such as a potentiometer 29 and battery 31, so that the intensity of the light from the source 28 can be adjusted at will.

In order to illuminate a substantially equal portion of the photosensitive surface in each tube tested, a beam defining mask 30 having an opening 30a therein is mounted on the arm 12 between the tube socket 14 and the light source 28. I have found that there is some variation in the alignment of the electrodes of different phototubes, so that it is preferable to provide some means for adjusting the mask 30 to insure that an equal portion of the photosensitive surface will be illuminated in each case. For example, the mask 30 can be held in a clamping structure 32 provided with a thumbscrew 33. In order to check the alignment of the mask 30, a screen 34 is mounted on the free end of the arm 12 beyond the tube socket 14, so that light from the source 28 will pass through the mask 30 and be partially interrupted by the photosensitive cathode C in the tube T being tested, thus casting a shadow on the screen 34. By cutting a small notch 30b on one edge of the opening 30a in the mask 30, the mask can be properly adjusted by reference to the shadow on the screen 34 so that an equal area on the photosensitive surface C in the tube T will be illuminated in all cases.

A switch 35 of the so-called "micro-switch" type is also mounted on the base 10 under the arm 12 and is adapted to be closed by the arm 12 slightly before the arm 12 strikes the stop 16. The purpose of the switch 35 will be explained hereinafter.

In accordance with my invention, the microphonic signals generated in the tube T being tested are evaluated in a testing network N which is responsive only to signals of predetermined amplitude and duration.

In considering the function of the testing network N in the apparatus being described, it is necessary to consider the nature of the microphonic signals which will be generated in an electron tube when the latter is subjected to mechanical shock. As is already known (see e. g. U. S. P. 1,825,548, Rockwood et al.), a microphonic signal generally consists of a damped wave train or transient, the magnitude and duration of which will be functions of the characteristics of the tube being tested, as well as of the type and magnitude of the mechanical shock to which the tube is subjected. Where it is only the initial amplitude of the microphonic which is of interest, the testing network N may consist of an amplifier 36 coupled to the tube being tested, a trigger circuit 38 which is responsive only to microphonic signals of predetermined amplitude from the tube T, and an indicator 40 connected to the trigger circuit 38 to produce an indication when the trigger circuit 38 is triggered by a microphonic signal of sufficient amplitude from the tube T. Where the term "trigger circuit" is used herein and in the appended claims, it is intended to mean a network in which a disturbance of sufficient magnitude will produce an abrupt change from a stable operating condition to a new operating condition which may be either stable or unstable.

In many instances, the duration or the decay rate of a microphonic is of more interest than the instantaneous initial magnitude thereof, since the elements in some tubes will vibrate longer than in others with the same amount of shock, and this even though the original amplitude of the microphonic signals are substantially the same. In order to evaluate the decay rate of a microphonic, a time delay trigger circuit 42 can be connected to the trigger circuit 38 to render the latter inoperative during a predetermined time interval after the tube T is shock excited, and then to allow the trigger circuit to respond if the microphonic still has sufficient amplitude. In order to distinguish from the generic term "trigger circuit," as previously defined, the term "time delay trigger circuit" is used herein and in the appended claims to designate a circuit having a stable operating condition and an unstable operating condition, the circuit being so arranged that a disturbance of sufficient magnitude will produce an abrupt change from the stable operating condition to the unstable operating condition, whereupon the circuit will automatically revert from the unstable to the stable operating condition within a time determined by the circuit parameters. With the time delay trigger circuit 42 in operation, the indicator 40 will respond only if the microphonic continues above the level required to trigger the circuit 38 after the lapse of the time interval established by the time delay trigger circuit 42. Whether or not the time delay trigger circuit 42 is used, it will be apparent that the testing network will be entirely automatic in operation, and that the results obtained will give an absolute indication of the relative merit of a tube being tested, without requiring any skill or judgment on the part of the operator. A typical circuit corresponding to the testing network N in Fig. 1 is shown in detail in Fig. 2.

Referring to Fig. 2, the phototube T to be tested is connected to a voltage supply source B+ (not shown) through a microammeter 50. The microammeter 50 will show the average current drawn by the tube T, and can be referred to in adjusting the brilliance of the light source 28 in Fig. 1 (by means of the potentiometer 29), so that each tube tested will be drawing the same average current prior to testing. A load resistor 54 is also connected in circuit with the tube T, and an amplifier 36 is connected to the resistor 54 to amplify the microphonic signal from the tube T. While not essential, the amplifier 36 lends greater flexibility to the apparatus, and for most accurate results should be designed to conform to the amplifying system used in the equipment for which tubes are being tested. The particular amplifier shown is conventional in design, and will not be described in detail.

The amplified microphonic signals from the tube T are supplied to the trigger circuit 38. The trigger circuit 38 contains a gas tetrode tube 56 of the type in which no anode current will flow until the grid potentials exceed certain critical values, whereupon the tube will suddenly pass a large anode current the magnitude of which will be substantially independent of the grid potentials. The cathode 58 of the gas tube 56 is connected to a voltage divider 60, 62 which is in parallel with the voltage supply B+, so that the cathode 58 will be held somewhat above ground potential. The control grid 64 of the gas tube 56 is connected to ground through a potentiometer 66 which can be adjusted to regulate the sensitivity of the trigger circuit, and the screen grid 68 of the tube 56 is connected to ground through a resistor 69 and a "clamping" diode 70. The diode 70 is provided to insure that the screen grid potential will never go above ground potential, although the diode 70 will permit the screen potential to drop below ground for a purpose to be explained. The anode 72 of the tube 56 is connected to the voltage supply B+ through a load resistor 74 and the micro-switch 35 (previously referred to in connection with Fig. 1), while a "glow" tube 40 is connected in parallel with the load resistor 74 to serve as an indicator for the apparatus.

The circuits in Fig. 2 thus far described are adequate to furnish an indication of the initial intensity of a microphonic signal from the tube T being tested. Since the control grid 64 and the screen grid 68 of the gas tube 56 will normally be at ground potential, while the cathode 58 will be at a positive potential, the gas tube 56 will normally be non-conducting. When the arm 12 in the apparatus of Fig. 1 is released by the cam 20, the resulting vibration of the electrodes in the tube T will produce a microphonic signal which may trigger the gas tube 56 and cause the indicator 40 to glow, depending on the relative gain of the amplifier 36, the relative setting of the sensitivity control 66 for the trigger circuit 38, and the relative initial intensity of the microphonic signal. Each time that the arm 12 is raised by the cam 20 in the shocking mechanisms, the microswitch 35 will open, removing the anode voltage from the gas tube 56, and extinguishing the gas tube and indicator current. As the arm 12 is released by the cam 20, the micro-switch 35 will close slightly before the arm 12 strikes the stop 16, thereby reapplying anode voltage to the gas tube 56. Assuming that the trigger circuit sensitivity control 66 has previously been adjusted to establish a standard of merit, the indicator 40 will give an absolute indication of the relative merit of the tube T.

Where it is desired to determine the duration of the microphonic signal, the trigger circuit 38 must be prevented from operating during a time interval which will give a measure of the decay rate of the microphonic. To this end, a switch 71 is provided to connect the screen grid 68 of the gas tube 56 to a time delay trigger circuit 42. The delay circuit 42 will supply a large negative voltage to the screen grid 68 of the tube 56 during a time interval starting slightly before the beginning of the microphonic signal and ending at some selected time thereafter.

There are various well known circuits, such as one-cycle multivibrators, phantastrons, and the like, all of which come within the definition previously given of a time delay trigger circuit. A so-called one-cycle multivibrator, which has been selected for purposes of illustration, includes a dual triode tube 80 having anodes 81, 82, control grids 83, 84, and cathodes 85, 86. The cathodes 85, 86 are connected to a common cathode resistor 88, while separate anode load resistors 90 and 92 are provided for the "right" and "left" sections of the tube 80 (as viewed in the drawing). The control grid 84 in the right section of the tube 80 is connected to the anode 81 in the left tube section through a capacitor 94 and is also connected to the cathodes 85, 86 through a variable resistor 96. The other control grid 83 is connected to a differentiating network, consisting of a capacitor 98 and a resistor 99, which is connected to the voltage source B+ through the switch 35.

Since the control grid 83 in the left section of the tube 80 will normally be at ground potential, while the cathodes 85, 86 and the other control grid 84 will normally be somewhat above ground potential, the left section of the tube 80 normally will be non-conducting, and the right section of the tube 80 normally will be conducting. When the switch 35 is closed by downward movement of the arm 12 (Fig. 1), a positive pulse of voltage will be applied to the grid 83 in the normally non-conducting (left) section of the tube 80, and current will begin to flow in the left section of the tube 80. The resulting drop in voltage at the anode 81 in the left section of the tube 80 will be passed through the coupling capacitor 94 to the control grid 84 in the right section of the tube 80, cutting off current flow in the right tube section and causing a sudden rise in voltage at the right section anode 82. This situation will continue until the capacitor 94 has discharged through the resistor 96. The sudden rise in voltage at the anode 82 in the right section of the tube 80 will be inverted and amplified in the inverter-amplifier stage 76, thereby applying a large negative voltage to the screen grid 68 in the gas tube 56. This negative voltage will prevent the gas tube 56 from responding to any microphonic signal appearing at the control grid 64 thereof until the delay network 42 has reverted to its original condition, at which time the voltage at the anode 82 in the right section of the tube 80 will drop, and the negative voltage will be removed from the screen grid 68 of the gas tube 56. The diode 70 will prevent the sudden rise in voltage at the screen grid 68 of the tube 56 from going appreciably above ground potential and triggering the tube 56. If the microphonic signal from the tube T being tested has not decayed below the critical level at the time the delay circuit 42 reverts to normal operating condition, the trigger circuit 38 will respond, turning on the indicator 40. Otherwise, the trigger circuit 38 and the indicator 40 will not respond, and the operator will know that the microphonic signal had decayed below the predetermined critical level within the selected time interval.

It will be understood that the length of the time interval established by the delay circuit 42 will be a function of the "time constant" of the resistor-capacitor combination 94, 96, and can be controlled by varying the resistor 96 for calibration purposes.

In some instances, it has been found that the time of closing of the micro-switch 35 varies slightly from one cycle of operation to another, and also that one tube T may respond more quickly to a mechanical shock than another tube. Either or both of these factors will tend to introduce a slight uncertainty in the measured decay time of the microphonic. If desired, a time delay control network 100 can be added to the circuit to provide means for obtaining a very accurate measurement of the time interval between the actual beginning of a microphonic signal, and the decay thereof to a predetermined level, as distinguished from a measurement of the time between an instant slightly before the tube T is shock excited and decay of the resulting microphonic signal to a predetermined level. The time delay control network 100 will function to terminate the delay interval of the time delay trigger circuit 42.

The time delay control network 100 includes a gas tetrode trigger tube 102, similar to the tube 56 in the trigger circuit 38, and a time delay trigger tube 104, similar to the tube 80 in the delay trigger circuit 42. The gas tube 102 is connected to receive microphonic signals from the amplifier 36, and is supplied with anode voltage through the microswitch 35. When the gas tube 102 is triggered by a microphonic signal from the amplifier 36, a positive voltage will be developed across a cathode resistor 106. This positive voltage will be differentiated in a resistor-capacitor network 108, 110, and the resulting positive pulse of voltage will trigger the time delay trigger tube 104. Since the tube 104 and associated circuit elements operate in precisely the same manner as do the elements in the network 42 previously described, a detailed analysis thereof will not be given. The output of the tube 104 can be applied to the input of the time delay trigger circuit 42 through a switch 112. Assuming that the switch 112 is closed, when the tube 104 is triggered, the resulting positive voltage pulse from the anode circuit of the right section of the tube 104 will have no effect on the delay tube 80 in the network 42 because the tube 80 will have been triggered previously by the closing of the micro-switch 35. However, when the cycle of operation of the tube 104 terminates, the resulting negative pulse from the anode circuit of the right section of the tube 104 will cut off conduction in the left section of the tube 80, thereby terminating the cycle of operation of the time delay trigger circuit 42. The delay time of the control network 100 can be adjusted by a variable resistor 114 in the grid circuit of the delay tube 104. Thus, it will be seen that the combined effect of the time delay trigger circuit 42 and the time delay control network 100 is to insure that the trigger circuit 38 will be inoperative from a time slightly prior to the generation of a microphonic until a later time accurately measured from the time when the microphonic actually begins.

In order to calibrate the apparatus for any particular test situation, it is necessary to adjust the sensitivity of the trigger circuit 38 to a level corresponding to the maximum intensity of microphonic signal that can be tolerated, and also to adjust the delay time of the delay trigger circuit 42, or the delay time of the control tube 104, as the case may be, to correspond with the maximum microphonic decay time that can be tolerated. It will be understood that these factors will vary from one case to another, and that no absolute values can be assigned thereto until the microphonic tolerances have been ascertained for a given case. There are several possible approaches to the problem of calibration, any one of which will give suitable results, although the accuracy will necessarily depend on the amount of care taken in setting up the standards of merit. For example, the sensitivity of the trigger circuit 38 and the delay time of the delay circuit 42 can be adjusted by a process of alternative small changes, using two tubes, one of which is known to have satisfactory characteristics, and the other of which is unsatisfactory, until the indicator 40 will light when the unsatisfactory tube is tested and will not light when the satisfactory tube is tested. A much more accurate and universal method of calibration is to calibrate the sensitivity control 66 in terms of microvolts or millivolts, and to calibrate the delay time controls 96 and 104 in terms of microseconds or milliseconds. Oscilloscope observations of microphonics in a particular piece of equipment can then be used as a basis for properly setting the sensitivity and the time delay controls.

Since many changes could be made in the apparatus shown and described, all within the scope and spirit of the invention, the foregoing is to be construed as illustrative, and not in a limiting sense.

What is claimed is:

1. Apparatus for determining the effect of mechanical shock and vibration on the operating characteristics of an electron tube, said apparatus comprising means for energizing said tube to simulate normal operation thereof, shock-producing means for subjecting said tube to a reproducible mechanical shock, a trigger circuit responsive only to signals of predetermined magnitude from said tube, and an indicator connected to said trigger circuit for producing an indication of the triggering of said circuit by signals from said tube.

2. Apparatus as defined in claim 1 wherein said trigger circuit includes a gas filled electron tube, a source of operating voltage for said gas tube, and switching means operatively associated with said shock-producing means for connecting said gas tube to said voltage source slightly before said tube to be tested is subjected to said shock.

3. Apparatus for determining the effect of mechanical shock and vibration on the operating characteristics of an electron tube, said apparatus comprising means for energizing said tube to simulate normal operation thereof, shock-producing means for subjecting said tube to a reproducible mechanical shock, a trigger circuit responsive only to signals of predetermined magnitude from said tube, circuit means coupled to said trigger circuit to prevent triggering thereof for a predetermined time interval starting slightly before said tube is subjected to said mechanical shock, and an indicator connected to said trigger circuit for producing an indication of the triggering of said circuit by signals from said tube.

4. Apparatus as defined in claim 3 wherein said circuit means includes a switch, and switch operating means operatively associated with said shock-producing means to operate said switch slightly before said tube is subjected to said shock.

5. Apparatus as defined in claim 3 wherein said circuit means includes (1) a time delay trigger circuit, and (2) means for triggering said time delay trigger circuit at a time slightly before said tube to be tested is subjected to said shock.

6. Apparatus for determining the effect of mechanical shock and vibration on the operating characteristics of an electron tube, said apparatus comprising means for energizing said tube to simulate normal operation thereof, shock-producing means for subjecting said tube to a reproducible mechanical shock, a trigger circuit responsive only to signals of predetermined magnitude from said tube, circuit means coupled to said trigger circuit to prevent triggering thereof for a predetermined time interval starting slightly before said tube is subjected to said shock and continuing after said tube is subjected to said shock, a circuit responsive to signals from said tube for terminating said time interval a predetermined time after receiving a signal from said tube, and an indicator connected to said trigger circuit for producing an indication of the triggering of said circuit by signals from said tube.

7. Apparatus for determining the effect of mechanical shock and vibration on the operating characteristics of an electron tube, said apparatus comprising means for energizing said tube to simulate normal operation thereof, shock-producing means for subjecting said tube to a reproducible mechanical shock, a trigger circuit responsive only to signals of predetermined magnitude from said tube, circuit means coupled to said trigger circuit and responsive to signals from said tube to prevent triggering of said trigger circuit for a predetermined time interval after receiving a signal from said tube, and an indicator connected to said trigger circuit for producing an indication of the triggering of said circuit by signals from said tube.

8. Apparatus for determining the effect of mechanical shock and vibration on the operating characteristics of a photo-electric tube, said apparatus comprising a base, an arm pivotally mounted on said base and having a free end, a tube holder mounted on said arm in the region of said free end for receiving said tube, means for repeatedly moving said free end of said arm a fixed distance away from and toward said base to mechanically shock said arm and hence said tube upon contact of said arm with said base, illuminating means including a source of light mounted on said base to illuminate a portion of said tube uniformly irrespective of said movements of said arm, and means for producing an indication of the generation of signals by said tube due to said shock.

9. Apparatus as defined in claim 8 wherein said illuminating means includes a beam-defining mask adjustably mounted on said arm intermediate said light source and said tube holder.

10. Apparatus as defined in claim 8 wherein said last named means includes a trigger circuit responsive only to signals of predetermined magnitude from said tube, and circuit means coupled to said trigger circuit to prevent triggering thereof for a predetermined time interval starting slightly before said tube is subjected to said shock.

11. Apparatus as defined in claim 8 wherein said last named means includes a trigger circuit responsive only to signals of predetermined magnitude from said tube.

12. Apparatus as defined in claim 11 wherein said trigger circuit includes a gas filled electron tube, a source of operating voltage for said tube, and switching means mounted on said base and operatively associated with said arm for connecting said gas tube to said voltage source slightly before said tube to be tested is subjected to said shock.

ROGER E. SCHELL.

REFERENCES CITED

The following references are of record in the file of this patent:

UNITED STATES PATENTS

| Number | Name | Date |
| --- | --- | --- |
| 2,418,437 | Vogt | Apr. 1, 1947 |
| 2,458,033 | Sterner | Jan. 4, 1949 |